F. W. CARLSON.
SILLCOCK AND OTHER VALVE.
APPLICATION FILED DEC. 18, 1908.
942,541.
Patented Dec. 7, 1909.
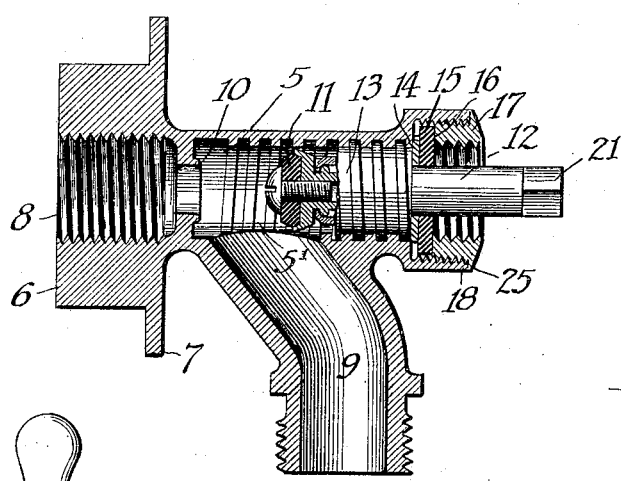
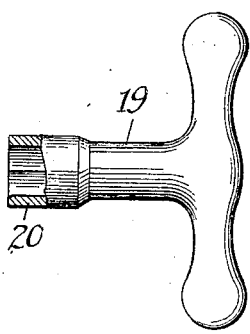
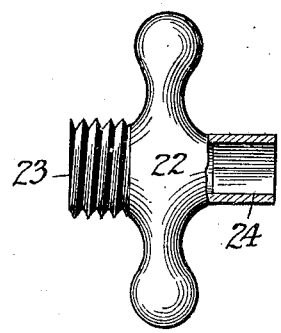
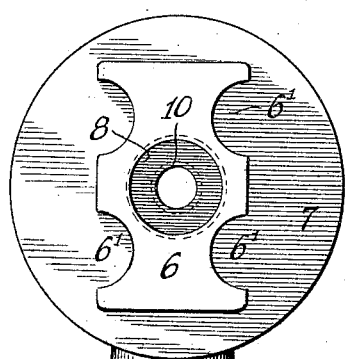
Witnesses
H. R. L. White
M. A. Kiddie
Inventor
Frank W. Carlson
By his Atty.

UNITED STATES PATENT OFFICE.

FRANK W. CARLSON, OF CHICAGO, ILLINOIS.

SILLCOCK AND OTHER VALVE.

942,541. Specification of Letters Patent. Patented Dec. 7, 1909.

Application filed December 18, 1908. Serial No. 468,099.

*To all whom it may concern:*

Be it known that I, FRANK W. CARLSON, a citizen of the United States, residing at Chicago, in the county of Cook and State of Illinois, have invented new and useful Improvements in Sillcocks and other Valves, of which the following is a specification.

The object of this invention is to prevent the theft of sillcocks and other valves, or parts thereof, after they have been set in place and especially in exposed places. And a further object is to provide a sillcock or other valve which can only be operated with a key of special construction and which can only be taken apart with a master key of special construction to repair or replace the valve disk.

In the accompanying drawings I have illustrated the invention embodied in a sillcock adapted to be applied to a water pipe and to be arranged generally on the outside of a plate and referring thereto, Figure 1 is a longitudinal sectional view showing the valve in open position. Fig. 2 is an end elevation. Fig. 3 illustrates a key for operating the valve. Fig. 4 illustrates a master key constructed to operate the valve and also to remove the locking device.

Referring to the drawings, 5 designates the body of the sillcock which is provided with an enlarged head 6 and an outwardly projecting flange 7. The head has a plurality of side recesses 6' which give the head an irregular outline. This head has a threaded opening 8 to receive the water pipe and the head is set in the foundation or frame of a building, preferably with cement or mortar, which fills the recesses 6' and makes interlocking engagement therewith. The head is of angular form and when it is thus set in place, with the flange 7 against the face of the foundation or frame of the building the body can not be turned to unscrew it from the pipe. The body has a nozzle 9 to receive a hose and a seat 10 for the valve disk 11. This valve disk is carried by a stem 12 which is enlarged and provided with a screw-thread at 13 to engage the thread 5' in the body. A washer 14 is arranged on the stem 12 to engage a shoulder 15 in the body and a rubber gasket 16 on the stem is clamped against said washer by a collar 17 screw-threaded in the outer end 18 of the body. The collar 17 is threaded interiorly and exteriorly and one of said threads is a right thread and the other a left thread. The valve disk is preferably connected to the stem in a manner which will permit a slight relative movement thereof so that it will better adjust itself to the seat 10.

A key 19 for the ordinary operation of the valve has an angular socket 20 to engage the angular end 21 of the stem. A master key 22 has a threaded stud 23 to screw into the collar 17 for the purpose of removing the collar from the body after which the stem and valve can be removed with the key 19. I may also provide the master key 22 with an angular socket 24 to fit the end 21 of the stem so that both the collar and the stem may be removed with the one master key. After the valve has been repaired or replaced and the stem again screwed into the body the collar may be screwed into place by the master key if the collar is first tightened on the master key with a tool of suitable character. This tightening temporarily locks the collar to the master key to hold these parts together until the collar is seated against the gasket 16 and then further movement of the master key will release it from the collar so that it can be unscrewed therefrom. The peripheral flange 25 of the collar tapers to a feather edge which ends just inside of the periphery of the outer end 18 of the body so that a tool can not be applied thereto for the purpose of removing the collar. I may make the opening in the collar and the thread therein, and likewise the threaded stud 23 of the master key, of special design so that it will be impossible to remove the collar and gain access to the stem and valve without the use of the master key, and thus I prevent theft of these parts of the valve.

Sillcocks and many other valves are often located in exposed positions on a building and where they can be easily removed and stolen, but my invention provides for permanently locking the body in the foundation or frame of the building so that it can not be unscrewed from the pipe, and for preventing the removal of the stem and valve without the use of a master key. The end 21 of the stem will be located within the collar 17 when the valve is seated and hence it is necessary to employ some tool or instrument which will avoid the angular end 21 of the stem and also enter the collar to operate the stem and open the valve. It is intended to have the flange 25 on the collar seated tightly against the end of the body so that a tool can not be applied thereto.

While my invention is particularly adapted for sillcocks which are almost always located in an exposed position on the frame or foundation of a building where access can be easily had thereto, it can obviously be embodied in other valves for a like purpose.

What I claim and desire to secure by Letters Patent is:

1. A sillcock comprising a body, a head on the body adapted to be seated in the frame or foundation of a building, said head being angular in form and having recesses in its sides, and an outwardly projecting flange around the head to lie against said frame or foundation.

2. A valve comprising a body, a seat in said body, a stem screw-threaded in the body, a valve disk on said stem to engage said seat, and a collar screwed into the outer end of the body to prevent the removal of the stem, said collar being threaded interiorly to receive a master key.

3. A valve comprising a body, a seat in the body, a stem screw-threaded in the body, a valve on the stem to engage said seat, a shoulder in the body, a washer on the stem to engage said shoulder, a gasket to engage said washer, and a hollow collar screw-threaded in the end of the body to engage said gasket, said collar being threaded interiorly to receive a master key and the end of said stem being located within said collar when the valve is seated and shaped to receive an operating key.

4. A valve comprising a body, a head at one end of the body provided with a threaded opening to receive a pipe, said head being angular in form and recessed at its sides to make locking engagement with the frame or foundation of a building, a seat in the body, a stem screw-threaded in the body, a valve disk on said stem to engage said seat, a shoulder in the body, a washer on the stem to engage said shoulder, a gasket on the stem, and a hollow collar screw threaded in the other end of the body against said washer, said collar being threaded exteriorly and interiorly and one of said threads being a right thread and the other a left thread.

FRANK W. CARLSON.

Witnesses:
 WM. O. BELT,
 M. A. KIDDIE.